Aug. 11, 1931.  A. L. EMENS  1,818,795
ELECTRICITY METER
Filed Jan. 11, 1929  2 Sheets-Sheet 2
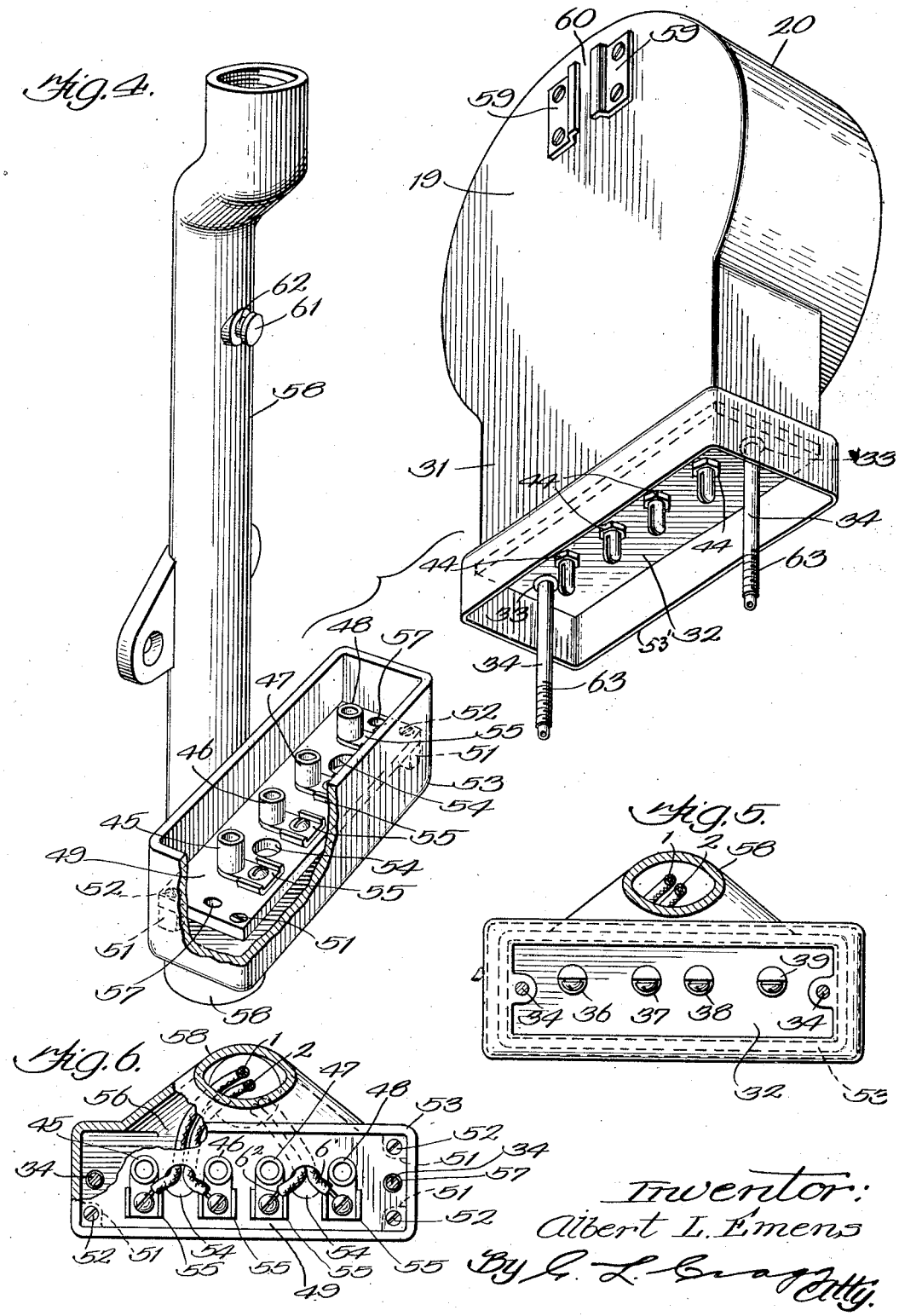

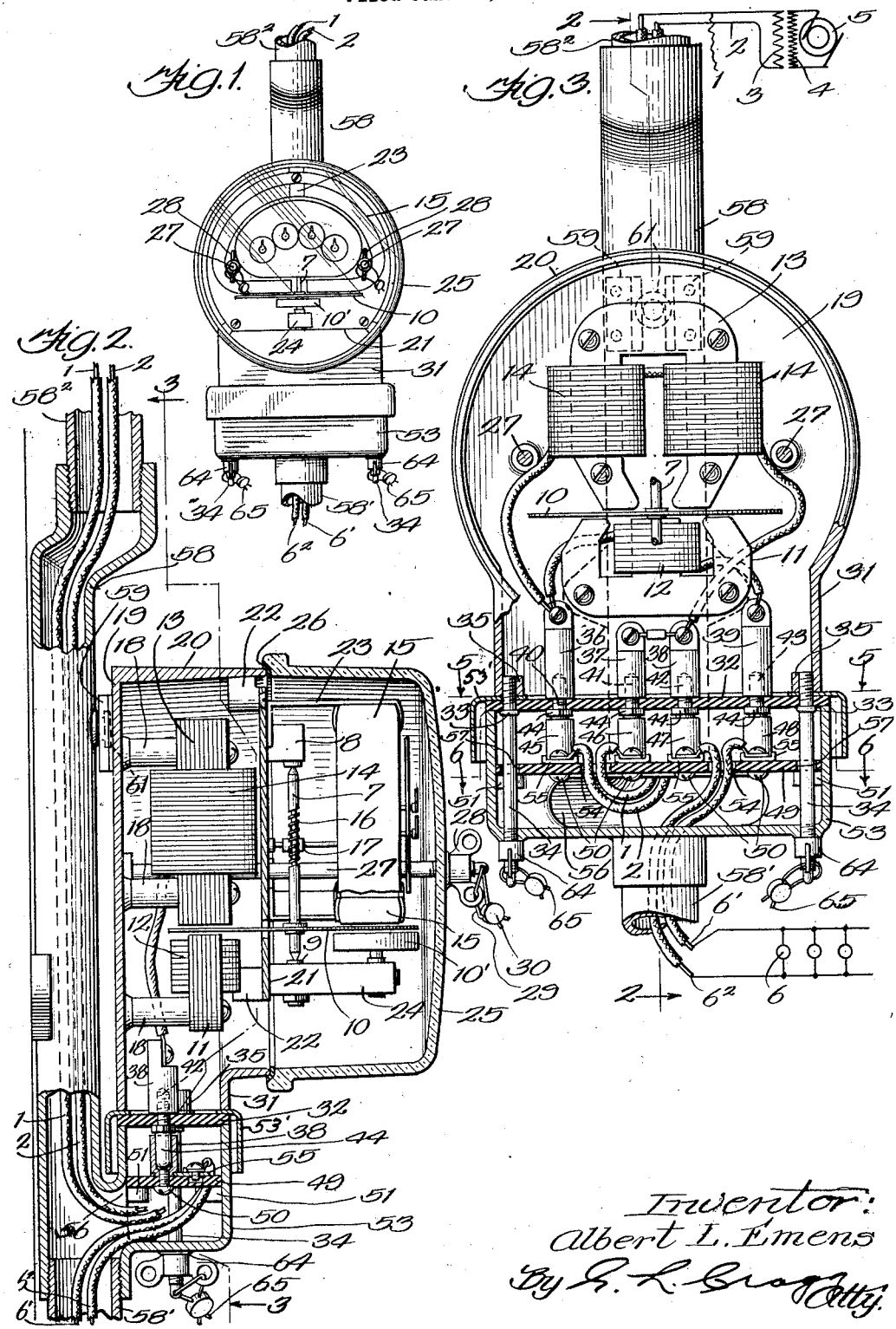

UNITED STATES PATENT OFFICE

ALBERT L. EMENS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER

Application filed January 11, 1929. Serial No. 331,730.

My invention relates to electricity meters, it having been designed particularly for use in connection with induction watt-hour meters though it is not to be limited to this use.

The invention has for its general object the provision of an improved meter mounting. In accordance with one characteristic of the invention the meter mounting is inclusive of a meter underlying support which carries line and load circuit terminal contacts which are complemental to contacts that are provided upon the supported meter and which engage the same when the supported meter is in place.

In accordance with another characteristic of the invention the mounting is inclusive of a support which engages a lower portion of the meter preferably a bottom face of the meter and an upright which engages the part of the meter above its bottom face. The meter is desirably sealed in assembly with the bottom support member of the mounting to prevent undetectable vertical displacement of the meter. The upright portion of the mounting is preferably behind the meter and has pin and slot connection with the meter, the slot portion of this connection being of such length that the pin cannot be displaced therefrom while the meter is in sealed assembly with the underlying support portion of the mounting. The upright portion of the meter mounting is preferably a conduit through which the terminal portions of the line circuit are led into connection with two of the contacts that are provided upon the underlying meter support and through which terminal portions of the load circuit are led into connection with the two remaining contacts that are provided upon the underlying meter support. Said underlying meter support is preferably hollow and encloses the contacts carried thereby and surrounds the meter terminal contacts which are desirably provided upon and depend from a terminal block that constitutes a top wall or closure for the hollow support and a bottom wall or closure for the opening in the meter casing into which casing the terminal meter contacts extend for connection with the meter windings. While the meter mounting is desirably inclusive of both the conduit and the hollow support, which constitutes a service connection box, I do not wish to be limited to the employment of both of these elements in all embodiments of my invention.

I will explain my invention more fully in connection with the accompanying drawings in which Fig. 1 is a front view illustrating a single phase alternating current induction watt-hour meter provided with the mounting of my invention, as such mounting is preferably constructed; Fig. 2 is a side elevation, on a larger scale, of the structure shown in Fig. 1, parts being shown in elevation and parts in section; Fig. 3 is a sectional view on line 3—3 of Fig. 2, the line and load circuits being diagrammatically indicated; Fig. 4 is a perspective view of the preferred form of mounting and of the meter mounted thereon but illustrated as being separated from the mounting, a portion of the service connection box being broken away for clearness of illustration; Fig. 5 is a sectional view on line 5—5 of Fig. 3 and Fig. 6 is a view partially broken away taken on line 6—6 Fig. 3.

I have illustrated transmission mains or line sides 1, 2 supplied from a suitable source of current, which, in an alternating current system of distribution, may be the secondary 3 whose primary 4 is shown as being supplied from an alternating current generating dynamo 5. The load illustrated is in the form of incandescent electric lamps 6. The energy consumed by the load is measured by a watt meter, usually of the induction watt-hour or integrating type, such a meter being illustrated in the drawings. This meter is inclusive of an upright spindle or shaft 7 suitably held in bearings 8 and 9. A horizontal aluminum armature disc 10 is carried by the spindle on which the disc is rigidly secured. This disc is turned proportionately to the energy consumed by the load by a magnet system that is inclusive of a current or series magnet and a pressure or shunt magnet. The current magnet is inclusive of an E shaped core of laminated iron 11 whose middle leg is wound by a coil 12 serially included in the main 2 and the load circuit side 6'. The pressure magnet is inclusive of a U shaped laminated iron core 13 whose legs are surrounded by the coils 14 which are connected in series in the same bridge between the distributing mains 1 and 2, this bridge being also between the load circuit sides 6', 6². The speed of the armature of the meter is checked by the damping permanent magnet 15 which is upon one side of the disc 10, a keeper 10' being upon the other side of the disc. The meter parts illustrated and described constitute a meter motor whose armature 10 and spindle 7 turn proportionately to the wattage in a manner well known to those familiar with the art.

A worm 16 is provided upon the spindle 7 and is in mesh with a pinion 17 that is in driving relation with the counting train of the meter, as is well understood without the necessity of further illustration. The cores of the current and pressure magnets are carried by posts 18 which, in turn, are carried by the upright back wall 19 of the meter casing. The arcuate wall 20 of the meter casing projects forwardly from the meter back 19 and surrounds the magnets. This casing is desirably formed of castiron. An upright plate 21, of iron, constitutes a magnetic shield which is interposed between the magnet system and the damping magnet. This plate is mounted upon ears 22 that are desirably integrally cast with the meter casing and are contained within such casing. Said plate is coplanar with the front edge of the meter casing. A clip structure, of which a portion 23 is shown, is carried by and upon the front face of the plate 21 and carries the damping magnet 15 in front of said plate. A post 24 is carried by and projects forwardly from the plate 21 and carries the keeper 10'. The upper bearing 8 is carried by and upon the front face of the aforesaid plate. The bearing 9 is carried by the post 24. A cover 25, preferably of glass, is of cup shape, the rim of the cup being carried upon the front edge of the meter casing, there being a packing 26 which is clamped between the cover and casing. The means illustrated for clamping the cover in place is inclusive of two rods 27 which are carried by the meter back 19 and they project forwardly therefrom. These rods pass through the front of the cover. Wing nuts 28 are screwed upon the front ends of said rods and serve to clamp the cover in place. Sealing wires 29 are passed through the front ends of the rods and through holes provided in the wing nuts. The ends of these wires are coupled by seals 30. Other means may be employed for clamping the cover in position.

The meter casing is cast with a straight sided continuation 31. Said casing is formed with an opening in its bottom end, this opening being closed by a plate of insulation 32 which is clamped in place by the shoulders 33 near the inner ends of the assembling rods 34, the inner end portions of these rods being screwed into the ears 35 that are cast within and integrally with the casing continuation 31. The insulating plate 32 preferably not only constitutes the closure for the bottom opening of the casing but also a mounting block for the terminals 36, 37, 38 and 39 of the magnet winding of the meter. These terminals are preferably in the form of upright rods whose lower ends are formed with threaded bores. Upright metallic rods 40, 41, 42 and 43 are respectively screwed into the lower ends of the aforesaid rods 36, 37, 38 and 39. The rods 40, 41, 42 and 43 are formed with shoulders 44 that are polygonal in contour. These shoulders press upon the terminal block 32 and clamp the same against the bottom face of the rods 36, 37, 38 and 39. Rods 40, 41, 42 and 43 constitute male contact members, the portions of these rods that are below the shoulders 44 being snugly received within the upright tubular female contact rods 45, 46, 47 and 48. These female contact rods are clamped against the top side of the insulating terminal block 49 by means of the screws 50 which are passed through this terminal block from the bottom side thereof. This block is mounted upon the ears 51 by means of screws 52. These ears 51 are cast integrally with and upon the interior of a service connection box 53. Holes 54 are formed through the terminal block 49, the conductors 1, 2, 6' and 6² being passed through these holes as indicated most clearly in Fig. 3. The end portions of these conductors that are upon the top side of the mounting block 49 are clamped into engagement with the clips 55 that project laterally and forwardly from said contacts 45, 46, 47 and 48. The service connection box is provided with an entrance opening 56 for the conductors 1, 2, 6' and 6², this opening having communication with the external air and the mounting block 49 being formed with openings 57 to furnish ventilation to cool the service connection box.

A metallic skirted cap 53' has its end wall clamped between the terminal block 32 and the bottom side of the meter casing. This end wall of such cap is formed with a large opening through which the meter terminals 36, 37, 38 and 39 pass. The skirt of the cap surrounds the terminal block 32 and the upper portion of the service connection box 53, this cap skirt thus depending below the meeting faces of said terminal block and service connection box to guard against the access of moisture into the interior of the box at this place.

The service connection box 53 desirably constitutes the support upon which the meter is carried and is also one of the members of the meter mounting device which I employ, the other members of this mounting device being inclusive of an upright conduit 58 that is preferably disposed behind the meter. The members 53 and 58 are desirably formed in one integral casting of iron, the entrance or inlet opening 56 for the service connection box being at the rear side of this box and also constituting the outlet opening for the conductors 1, 2, 6' and 6² that find passage through the conduit 58. The conductors 1 and 2 pass downwardly through said conduit and into the service connection box while the conductors 6' and 6² pass upwardly through the lower end of this conduit and through the downwardly extending continuation 58' that is screwed upon the main conduit portion 58. The conduit 58 is thus provided mainly for the line sides 1 and 2 while its continuation 58' is provided mainly for the load circuit sides 6', 6². The conduit 58 may be provided with a continuation 58², at its upper end, which is of suitable length to enclose and guard as much of the conductors 1 and 2 as is desired.

Two clips 59 are screwed upon the back of the meter casing considerably above the service connection box and preferably near the top of the meter casing. These clips are vertically arranged opposite each other and are offset at their adjacent edge portions there to be spaced from the back of the meter casing, the clips being so related as to provide an upright slot 60 having its sides margined by shoulders which receive the head 61 of a pin 62 between them and the back of the meter casing. The stem of the pin passes between the sides of said slot 60. This pin is provided upon the front of the conduit 58 and is located at the middle of said slot when the meter is carried upon its support 53. The lower ends of the rods 34 pass through smooth holes in the bottom of the service connection box or meter support 53. Clamping wing nuts 64 are screwed upon the outer ends of the rods 34 to prevent the meter from being lifted from its support, sealing wires 65 being passed through holes in the lower ends of these rods and in the wings of the nuts 64 to prevent the nuts from being undetectably loosened. These nuts thus serve to hold the pin 62 in the mid-portion of the slot 60 so that separation of the meter casing, at its upper portion, from the conduit 58 is guarded against.

Changes may be made without departing from the invention.

Having thus described my invention, I claim:

A support for an electricity meter comprising a tubular body portion open at both ends and having means at each of said ends for connection to a conductor conduit and an integral hollow lateral extension on the body, said extension being shaped to provide a connection casing directed longitudinally of the body and all of whose side walls are formed independently of the body, said connection casing having an open free end whose edge constitutes a seat for a meter.

In witness whereof, I hereunto subscribe my name.

ALBERT L. EMENS.